(12) United States Patent
Chen

(10) Patent No.: US 7,627,114 B2
(45) Date of Patent: Dec. 1, 2009

(54) EFFICIENT MODULAR REDUCTION AND MODULAR MULTIPLICATION

(75) Inventor: Chin-Long Chen, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 1131 days.

(21) Appl. No.: 10/263,032

(22) Filed: Oct. 2, 2002

(65) Prior Publication Data

US 2004/0066934 A1 Apr. 8, 2004

(51) Int. Cl.
*H04L 9/00* (2006.01)
(52) U.S. Cl. .............................. 380/30; 380/28; 380/286
(58) Field of Classification Search .................... 380/28, 380/30, 286
See application file for complete search history.

(56) References Cited

U.S. PATENT DOCUMENTS

| | | | | |
|---|---|---|---|---|
| 5,321,752 A * | 6/1994 | Iwamura et al. | ............. | 713/174 |
| 5,742,530 A * | 4/1998 | Gressel et al. | ............. | 708/491 |
| 5,828,590 A * | 10/1998 | Chen et al. | ............. | 708/628 |
| 6,209,016 B1 * | 3/2001 | Hobson et al. | ............. | 708/491 |
| 6,614,909 B1 * | 9/2003 | Ryu et al. | ............. | 380/30 |
| 6,662,201 B1 * | 12/2003 | Kawamura | ............. | 708/491 |
| 6,925,563 B1 * | 8/2005 | Jennings | ............. | 713/174 |
| 7,043,515 B2 | 5/2006 | Stojancic | ............. | 708/491 |
| 2002/0039418 A1 * | 4/2002 | Dror et al. | ............. | 380/28 |
| 2003/0182339 A1 * | 9/2003 | Hojsted | ............. | 708/491 |
| 2003/0206628 A1 * | 11/2003 | Gura et al. | ............. | 380/28 |

OTHER PUBLICATIONS

C. K. Koc; C. Y. Hung; "Fast Algorithm for Modular Reduction"; IEE Jul. 1998; vol. 145, No. 4; pp. 265-271.*

* cited by examiner

*Primary Examiner*—Carl Colin
(74) *Attorney, Agent, or Firm*—William A. Kinnaman, Jr.

(57) ABSTRACT

Modular reduction and modular multiplication for large numbers are required operations in public key cryptography. Moreover, efficient execution of these two operations is important to achieve high performance levels in cryptographic engines and processes. The present invention uses multiplication and addition instead of using division and subtraction to perform modular arithmetic. The present invention also achieves some of its advantages through processing which begins with the high order bits coupled with judicious observations pertaining to circumstances under which carry output signals from addition operations are generated. These carry output signals are used to provide corrections which thus enable the use of the higher order bits and the efficiencies that such use engenders. Additionally, unlike other methods, the present invention avoids the baggage of preprocessing and post processing operations.

13 Claims, 3 Drawing Sheets

EFFICIENT MODULAR REDUCTION AND MODULAR MULTIPLICATION

BACKGROUND OF THE INVENTION

The present invention is generally directed to circuits and methods for use in public key cryptography. Accordingly, the present invention is directed to computations involving modular arithmetic, that is, arithmetic modulo an integer N where N is typically very large and where the result is the remainder after a conventional division by N. More particularly, the present invention is directed to circuits and methods for performing modular reductions, a form of division. Even more particularly, the present invention is directed to circuits and methods for performing multiplication modulo N.

Modular reduction and modular multiplication are two elementary operations that are carried out in most public key cryptography systems. Several techniques are known for performing these operations. For example, to calculate the modular reduction of A modulo N, that is, to determine the remainder when A is divided by N, there are essentially two approaches: the conventional method and the Montgomery method. Both of these methods reduce the number of significant digits of A mod N in a sequential process. The conventional method reduces the number of significant bits in A mod N starting from the most significant digits by a process of division and subtraction. On the other hand, the Montgomery method reduces the number of significant digits using a process of multiplication followed by addition starting instead from the least significant digits. In the conventional method, the quotient of the most significant digits of A divided by N is obtained first. Then the product of the quotient and the modulus N is subtracted from A. The resultant number is the answer if it is less than the modulus. If the resultant number is not less than the modulus, then the division and subtraction process continues. In the Montgomery method, A is added to the product of N and a single digit calculated from the least significant digit of A. The least significant digit of the sum of this addition is zero. Thus, the sum is shifted one digit to the right to remove the least significant digit. In the Montgomery method, these steps are repeated m times, where m is the number of significant digits in N. At the end of the process, the resultant number is $(A/R^m)$ mod N, where R is the value that a single digit can represent. The complex operation of division is not required in the Montgomery method. However, the Montgomery method produces a transformed result. Preprocessing and post processing are required in the Montgomery method to obtain the final result.

SUMMARY OF THE INVENTION

In accordance with a preferred embodiment of the present invention there is provided a method and a circuit for modular reduction. There is also provided a first method and circuit for modular multiplication together with an improved variation thereof.

In the process herein for modular reduction it is assumed, without any loss of generality which is easily provided by the padding of high order zero bit positions, that the number whose modulus is to be computed is divided up into n blocks with k bits in each block. Each k bit block then becomes a digit in a representational base R which is selected to be of the form $2^k$. Likewise, without any loss of generality and for the same reasons, the modulus N is assumed to be partitioned into m blocks also with k bits in each block. Prior to the start of the process or the operation of the circuit, the number $R_N = R^{m+1}$ mod N is either generated, supplied or loaded from a preset memory source. For practical situations n>m, for otherwise the result is trivially easy to find. The modular reduction method employed herein starts the process with the high order (mk+2k) bits of the operand, A, stored in an intermediate result register and takes advantage of the fact that multiplication by R is readily accomplished via a left shift of k bits. The high order k bits of the intermediate result register are multiplied by $R_N$ and the result is added to the low order (mk+k) bits of the intermediate result register. If this operation produces a carry out (of the high order bit position), then the value $R_N$ is added to the result before it is returned to the low order (mk+k) bit positions of the intermediate result register. The contents of this register are then shifted k bits to the left and the next lower k bit block of the operand A is loaded into the low order k bit positions of this register. This process continues until the last k bit block of the operand A is processed, with the result that A mod N becomes the final value in the intermediate result register.

In the process herein for modular multiplication, as above the value $R_N = R^{m+1}$ mod N is either precalculated or retrieved from memory or a register. And as above, the multiplicand, A, is assumed to be partitioned into m blocks of k bits each. The same is true of the multiplier B. The result, Z, is A×B modulo N which can have (m+1) bits. Recall that this is modular multiplication which is different from normal multiplication which generally returns (2m−1) bits. The results are preferably accumulated in an intermediate storage register, Z. The process begins with the generation of $Z+AB_i$ where $B_i$ is the $i^{th}$ k bit block of B, starting from the high order positions (that is, $B_0$ is the lower order k bits). If the addition operation generates a carry out, then the value $R_N$ is added to Z; if not nothing (that is, zero) is added. In the second major portion of an iterative process, the high order k bits of Z are multiplied by $R_N$ and added to the low order (mk+k) bits from the result of the previous addition (or additions, depending on whether the carry occurs) but before the addition k bits, all of which are zero, are appended to the second augend, thus effectively providing a multiplication by R. If this second addition produces a carry out, the same "corrective" step as above is also employed, namely the addition of $R_N$ to the result of the second addition. The result is stored in the intermediate register (or result location in memory) and the process continues with the next lower order k bits of multiplier B. It is thus seen that this process employs two multipliers and four adders, two of which are conditioned adders which "normally" add zero to the result unless there is a carry out from an immediately earlier addition. This process is very easily implemented via circuits comprising adders, multipliers and shift registers connected to carry out the process.

A variation of the process and circuit above is also provided herein. It operates in essentially the same way as above, but instead employs the intermediate result register, Z, as the point in the process for effective multiplication by R. (that is, by appending zeros) and also for the point in the process for selecting the high order bits of $Z_m$ for multiplication by $R_N$. This variant in the process and circuit employs the same number of additions and adders as above, as well as the same number and size of multiplier. However, by introducing the aforementioned changes at the Z register (which, as above, acts as an accumulator and/or intermediate storage register) point, there is provided an opportunity for the two multiplication operations to be carried out with much greater overlap in time, thus reducing the critical path for signal throughput and accordingly producing a great speed of circuit operation.

Accordingly, it is an object of the present invention to construct circuits for performing operations of modular reduction and modular multiplication particularly where the numbers involved are large.

It is also an object of the present invention to provide methods for carrying out modular arithmetic operations which avoid the disadvantages which exist in currently available approaches to the problem.

It is a still further object of the present invention to advance the state of the art in public key cryptography.

Lastly, but not limited hereto, it is an object of the present invention to produce circuits for public key cryptography which are less complicated and which can carry out modular reductions and modular multiplications rapidly and efficiently.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
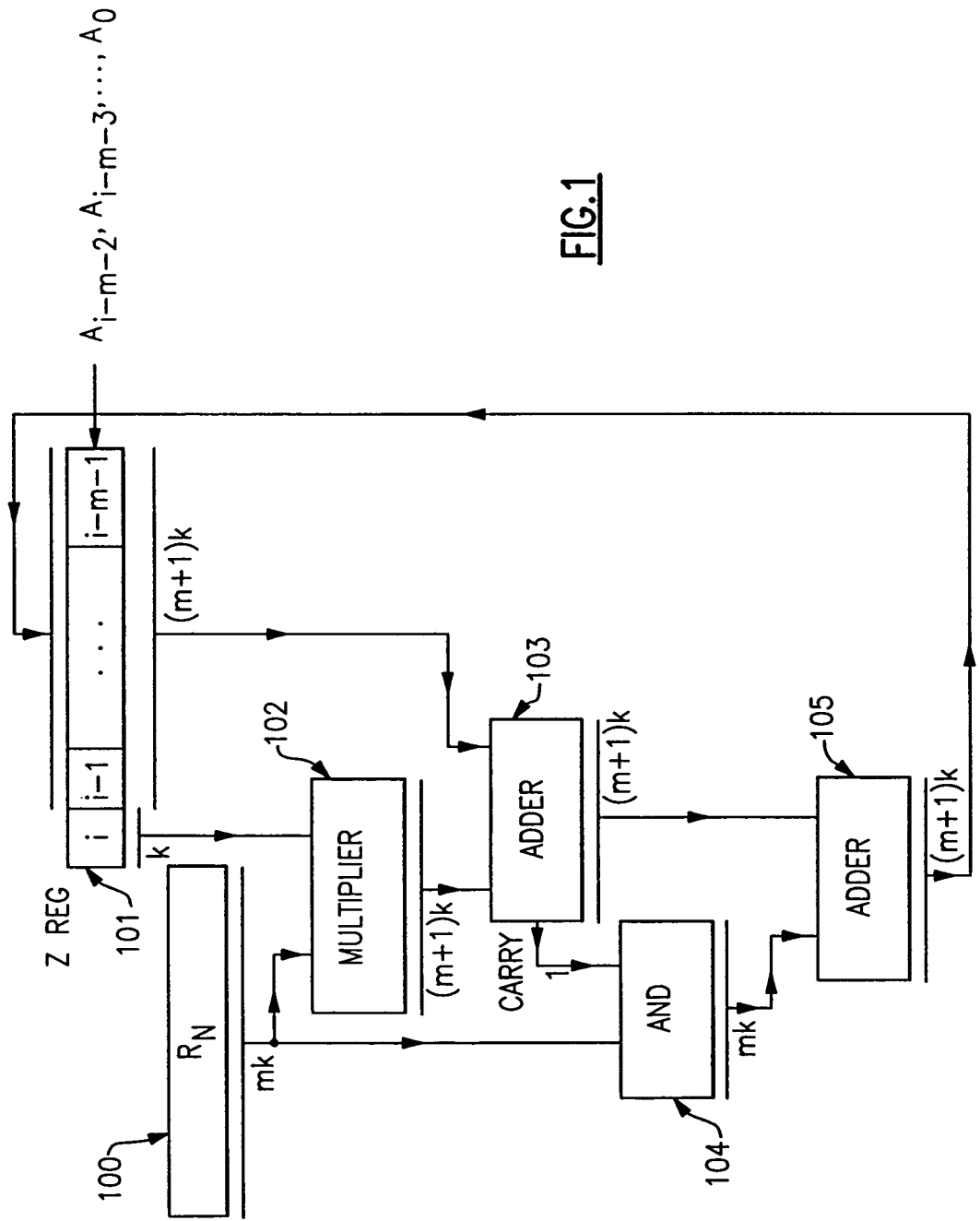
FIG. 1 is a block diagram of a circuit in accordance with the present invention for carrying out modular reduction operations.

In the present application a new approach in the calculation of A mod N is provided. As in the conventional method, the present invention produces A modulo N sequentially starting from the most significant digits. However, the present invention employs multiplication and addition instead of division and subtraction. However, in contrast to the Montgomery method, there is no "baggage" involving preprocessing or involving post processing.

The modular reduction method of the present invention is described first. Following that description, there is provided a description of how that method is applied to modular multiplication. Two schemas for modular multiplication are described.

Modular Reduction

The numbers involved in cryptographic applications are usually very large. For example, values for the modulus N may be in the order of thousand bits. Accordingly, for purposes of both descriptional and operational efficiency, certain numbers herein are represented as polynomials in R, where $R=2^k$. In particular, we represent A as $A_{n-1}R^{n-1}+\ldots+A_1R+A_0$ and N as $N_{m-1}R^{m-1}+\ldots+N_1R+N_0$, where the values of the coefficients of the polynomials lie between 0 and $2^k-1$, where $A_{n-1}$ and $N_{m-1}$ are not zero and where, in general, n is larger than m.

The following notation is also used in the present description, which provides a view of both why and how the methods and circuits herein work to perform the desired functions. The remainder of A divided by N is referred to as Z, where Z=A mod N. The standard congruence relation A≡B mod N says that A and B have the same remainder when they are divided by N. One of the objectives herein is to obtain the value Z=A mod N, where Z is the remainder of A divided by N, as just specified. The present approach is to efficiently obtain Z' with m+1 digits such that the remainder of Z' divided by N is equal to Z, that is, Z=Z' mod N, and Z'≡A mod N. To obtain Z from Z', one can use any variation of the conventional method. The preferred herein precalculates and stores a constant value $R_N=R^{m+1}$ mod N. Note that N is less than $R^m$ and $R_N$ is less than N. Thus, $R_N<R^m-1$.

Consider a polynomial $C=C_{m+1}R^{m+1}+C_mR^m+\ldots+C_1R+C_0$ that represents an (m+2) digit number. A process for finding a polynomial that represents an (m+1) digit number and is congruent to C modulo N is demonstrated below.

Suppose that Let $C'=C_mR^m+\ldots+C_1R+C_0$, which is C with the most significant digit removed, that is, $C=C_{m+1}R^{m+1}+C'$. Since $R_N=R^{m+1}$ mod N, we have $C''=C_{m+1}R_N+C'\equiv C$ mod N. Furthermore, $C'<R^{m+1}$, $C_{m+1}<R$, and $R_N<R^m-1$, thus $C''<2R^{m+1}$. That is, the addition of two (m+1) digit numbers $C_{m+1}R_N$ and $C'$ may have a carry of value no more than one. If the carry is zero, C'' is an (m+1) digit number congruent to C modulo N. If the carry is one, then set $C'''=(C''-R^{m+1})+R_N$. Then C'''≡C mod N. It is now shown that C''' is an (m+1) digit number. We note that:

$$C''=C_{m+1}R_N+C'\leq(R-1)(R^m-2)+R^{m+1}-1, \text{ and}$$

$$C'''=(C''-R^{m+1})+R_N\leq(R-1)(R^m-2)+R^{m+1}-1-R^{m+1}+R^m-2.$$

Thus, $C'''\leq R^{m+1}-2R-1$. Therefore, the addition of $(C''-R^{n+1})$ and $R_N$ for C''' produces no carry and C''' has (m+1) digits, as stated above.

This process can be taken one step further: suppose that $C=C_{i+1}R^{i+1}+C_iR^i+\ldots+C_1R+C_0$ is an (i+2) digit number, $C'=C_iR^i+\ldots+C_1R+C_0$, and $C''=C_{i+1}R_NR^{i-m}+C'$. Then C''≡C mod N. In addition, C'' is less than $2R^{i+1}$. If C'' is less than $R^{i+1}$, C'' is an (i+1) digit number. If C'' is greater than $R^{i+1}-1$, then $C'''=C''-R^{i+1}+R_NR^{i-m}\equiv C$ mod N and C''' is an (i+1) digit number. This modular digit reduction process is used repetitively to obtain a number of (m+1) digits congruent to C modulo N.

Accordingly, based on the process and the results indicated above, the following algorithm is thus seen to be employable to achieve modular reduction:

Modular Reduction Algorithm: Z=A mod N

Inputs to the process:

$$A=A_{n-1}R^{n-1}+\ldots+A_1R+A_0$$

$$N=N_{m-1}R^{m-1}+\ldots+N_1R+N_0$$

$R=2^k$; typically, n>m (if not the result is obtained trivially).

$R_N = R^{m+1} \bmod N, R_N < N$

1.

$Z = A$ $\quad = Z_{n-1}R^{n-1} + \ldots + Z_1 R + Z_0$

2. For i=n−1 to m+1, do $Z = Z - Z_i R^i + Z_i R_N R^{i-m-1}$

If $Z_i \neq 0$, $Z = Z - R^i + R_N R^{i-m-1}$

3. Sequential modular reduction on Z to a value such that Z<N.

A block diagram is shown in FIG. 1 which provides a hardware implementation of steps 1 and 2 of the modular reduction algorithm described above. The value of $R_N$ is stored in $R_N$ register 100. Z register 101 is a shift register whose low order (m+1) digits holds the temporary result. The low order digit of Z register 101 is filled with the next high order digit of A as Z register is shifted to the left (high order positions) in one of the (n−m−1) iterations. Multiplier 102 multiplies $R_N$ by the single digit number $Z_i$ from the leftmost k bits of Z register 101 to produce an (m+1) digit output. Adder 103 is then used to produce the sum of the output of multiplier 102 and the low order (m+1) digits of Z register 101. $R_N$ is added, by means of adder 105, to the output of adder 103 only if the carry output signal from adder 103 is "1" (that is, if and only if a carry occurs). Accordingly, the output from $R_N$ register 100 is supplied to AND 104 whose other input is the aforementioned carry signal from adder 103. The result from adder 105 is then put back into Z register 101 to end one iteration. The process is repeated until the contents of Z register 101 are less than or equal to N.

Modular Multiplication

Figure 2:
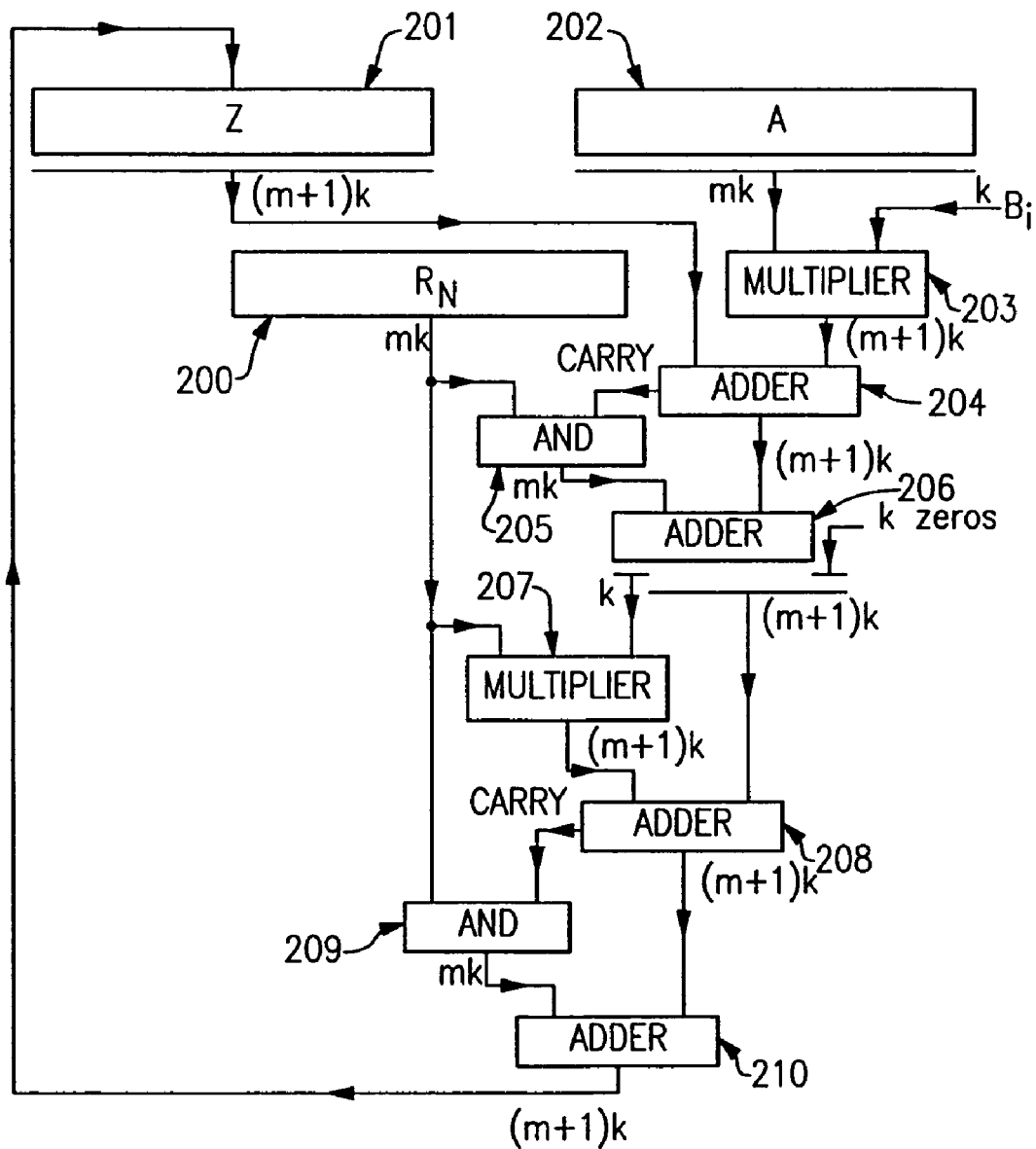
FIG. 2 is a block diagram of a circuit in accordance with a first embodiment of the present invention for carrying out modular multiplication.
Figure 3:
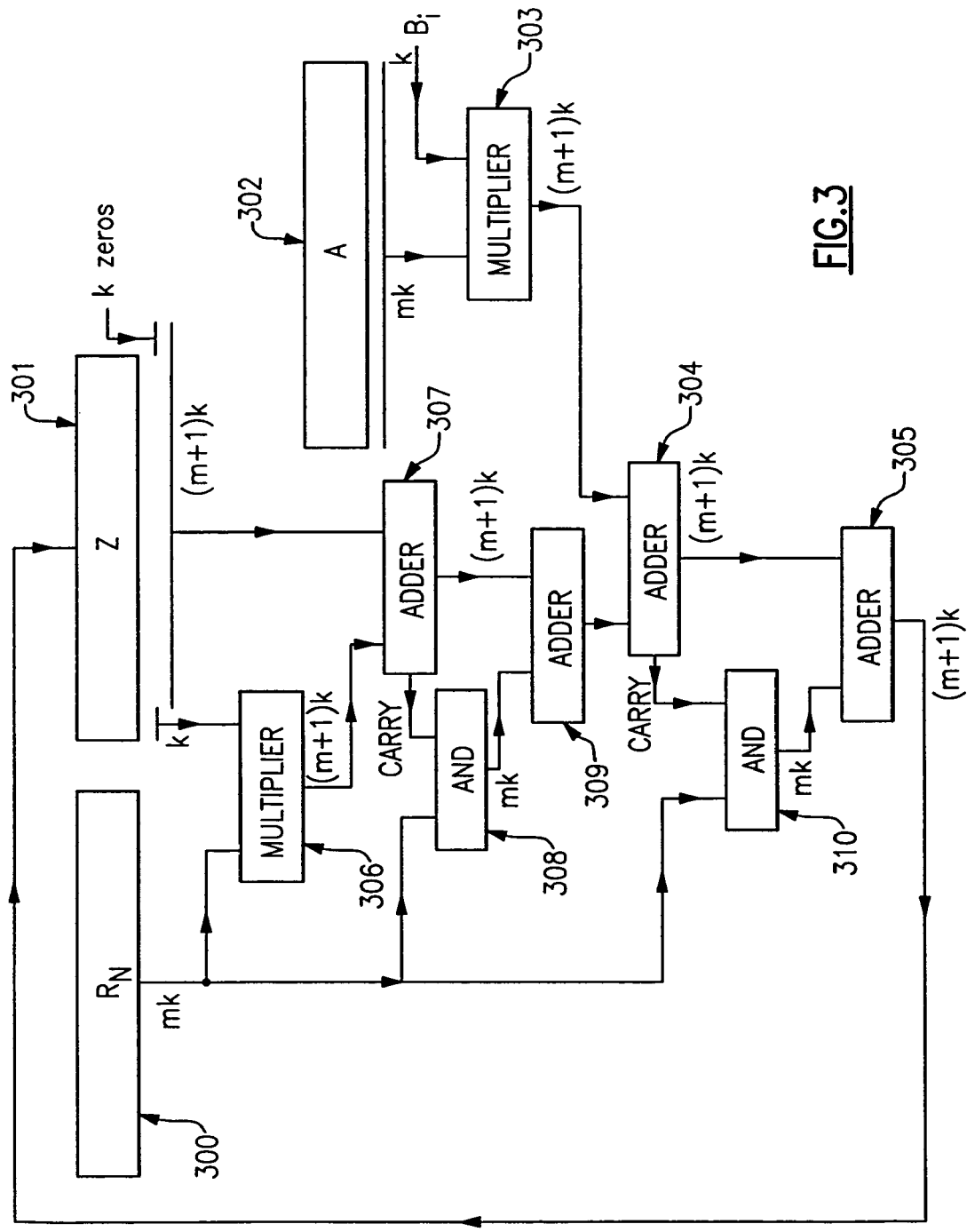
FIG. 3 is a block diagram of a circuit in accordance with a second embodiment of the present invention for carrying out modular multiplication.

The present invention provides two methods and two circuits for calculating A×B modulo N. The process and method described and illustrated in FIG. 2 is referred to herein as Algorithm I. The process and method described and illustrated in FIG. 3 is referred to herein as Algorithm II. Both of these are now described in detail, beginning with Algorithm I.

The calculation of A×B modulo N can be carried out by first obtaining the product of A and B, and then applying a process for modular reduction of the product to a number smaller than N. This is, however, not a preferred approach since a modification of this approach merges together operations of multiplication and modular reduction to produce a more efficient process and simpler circuit. For the purpose of providing a better understanding of the present invention, it is assumed herein that A, B and N are all m digit numbers. The product of A and B is normally a number with 2m digits. To reduce the size of the register for holding the product, one modularly reduces the product whenever A is multiplied by a single digit of B. Note that by a "digit of B" is meant a block of k bits representing $B_i$. This approach reduces the size of the register by a factor close to two.

To best understand this approach, it is supposed that $A = A_{m-1}R^{m-1} + \ldots + A_1 R + A_0$, and that $B = B_{m-1}R^{m-1} + \ldots + B_1 R + B_0$. Then A×B is obtained sequentially as $A \times B = ((\ldots (AB_{m-1}R + AB_{m-2})R + \ldots )R + B_0)$. In each step of the iteration, the partial product $AB_i$ is added to a temporary product. The sum is then multiplied by R, as the algebra indicates. However, it is noted that, because of the choice for R, the multiplication by R is performed by a shift operation and does not require special multiplication circuits. In this regard attention is directed to adder 206 where there are k bits of zeroes provided as the lower order k bits of the output of adder 206, effectively performing the desired multiplication. Any additional hardware cost is minimal. A modular reduction process is then followed, as described above, to produce the desired result, namely: A×B mod N. The following is a description of the process employed.

Modular Multiplication (Algorithm I): $Z = A \times B \bmod N$

Inputs to the process:

$A = A_{m-1}R^{m-1} + \ldots + A_1 R + A_0$ $B = B_{m-1}R^{m-1} + \ldots + B_1 R + B_0$ $Z = Z_m R^m + \ldots + Z_1 R + Z_0$ $R_N = R^{m+1} \bmod N, R_N < N$ The process:

Step 1. Z=0

Step 2. For i=m−1 to 1, do $Z = Z + AB_i$

If carry=1, then $Z = Z + R_N$, else $Z = Z + 0 = Z$.

$Z = (Z - Z_m R^m)R + Z_m R_N$

If carry=1, then $Z = Z + R_N$, else $Z = Z + 0 = Z$.

Step 3. $Z = Z + AB_0$

Step 4. Modular reduction on Z to a value less than or equal to N.

A block diagram of a circuit for carrying out the process indicated above for Steps 1-3 of Algorithm I above for modular multiplication is shown in FIG. 2. Z register 201 holds the result. At the beginning of the process the contents of register 201 are set to zero. Likewise at the start of the process, $R_N$ register 200 holds the value $R^{m+1} \bmod N$, which is a constant during the entire process. Multiplicand register 202 contains the binary representation for A which, as is indicated above, is considered to be partitioned into m "chunks" of k bits each. Likewise, multiplier B is also considered to be partitioned into m "chunks" of k bits each, with the higher order bits of multiplier B being supplied to multiplier 203 at the rate of k bits at a time, that is, at each iteration of the process. Clearly, $B_{m-1}$ is supplied first to multiplier 203, then $B_{m-2}$, and so on down to $B_1$. The output of multiplier 203, $AB_i$, is supplied to adder 204 where it is added to the current value in Z register 201 to form $Z + AB_i$, as set forth in step 2 above. If the addition in adder 204 produces a carry signal output, then, under control of AND gate 205 which receives the carry signal from adder 204, $R_N$ is added to perform the operation $Z = Z + R_N$, also as described in step 2 above. This latter operation is carried out by adder 206. Furthermore, to produce the same effect as a multiplication by R, k bits, all of which are zero, are provided as if they were the rightmost k bits from the output of adder 206. The high order or leftmost k bits from the output of adder 206, representing the leftmost k bit positions in Z, namely $Z_m$, are supplied to multiplier 207 to form the product $Z_m R^m$ as is also shown in step 2 above, noting again that $R_N = R^{m+1} \bmod N = R \cdot R^m \bmod N$. It is also especially noted that after k bits, all of which are zero, are appended to the rightmost bit positions of the output from adder 206, only the rightmost (m+1)k bits (out of a total now of (m+2)k bits) are supplied to adder 208. This effectively removes the high order k bits from Z; stating this more symbolically, the output of adder 206 which is supplied to adder 208 is $(Z-Z_m R^m)R$, as specified in step 2 above. When the addition operation in adder 208 produces a carry indication, AND gate 209 receives it and uses it to control whether or not $R_N$ is added, in adder 210, to the output of adder 208. The output of adder 210 is returned to register 201 which contains the partial result of the process. The process continues for (m−1) iterations as new values for the "digits" of B (that is, the $B_i$ values) are supplied from a shift register for B (not shown) to multiplier 203. In the last of the total of m steps the value $B_0$, the least significant digit of B is provided to multiplier 203 and the circuit computes the final value of $Z = A \times B \bmod N$.

Multiplication (Algorithm II): $Z = A \times B \bmod N$

The process described below is a variation of Algorithm I. Inputs to the process:

$A = A_{m-1} R^{m-1} + \ldots + A_1 R + A_0$ $B = B_{m-1} R^{m-1} + \ldots + B_1 R + B_0$ $Z = Z_m R^m + \ldots + Z_1 R + Z_0$ Precalculate: $R_N = R^{m+1} \bmod N$, $R_N < N$ The process:

Step 1. Set Z=0

Step 2. For i=m−1 to 0, do $Z = (Z - Z_m R^m)R + Z_m R_N$

If carry=1, then $Z = Z + R_N$, else $Z = Z + 0 = Z$.

$Z = Z + AB_i$

If carry=1, then $Z = Z + R_N$, else $Z = Z + 0 = Z$.

Step 3. Sequential modular reduction on Z to a value less than N.

The operation of the circuit shown in FIG. 3 is similar to that shown in FIG. 2. For ease of understanding, it is possible to map the operations carried out in Algorithm II above with specific circuit components in FIG. 3. For example, in forming $(Z - Z_m R^m)R + Z_m R_N$, the addition is carried out in adder 307 and the multiplication for $Z_m R_N$ is carried out by multiplier 306. The expression $(Z - Z_m R^m)R$ is produced by the introduction of k bits of zeros as the low order output bits from Z register 301, which is used to store intermediate results between iterations, and by the selection of the leftmost k bits of Z register 301. (This is similar to the operations carried out by adder 206 in FIG. 2.) If there is a carry output from adder 307, under control of AND gate 308, adder 309 forms the result $Z + R_N$, the value $R_N$, from register 300, being added only if there is a carry out from adder 307. The formation of the expression $Z + AB_i$ is produced using multiplier 303, with input A from register 302 and $B_i$, to produce the product $AB_i$ which is added via adder 304 to the current intermediate value for Z. Again, if there is a carry produced by the addition in adder 304, the carry signal and AND gate 310 provide a mechanism for the conditional addition of $R_N$ in the last portion of step two in Algorithm II above, as carried out by adder 305. The output of adder 305 is provided as a feedback to Z register 301 and the process thus continues with the next of the m iterations with the next lower order digits of B (that is, the next $B_i$) being supplied to multiplier 303.

The circuit shown in FIG. 3 represents a preferred embodiment of the present invention since it permits the two more computationally intensive multiplication operations, as carried out by multipliers 306 and 303, to have a greater overlap in time. The circuit in FIG. 3 is thus also characterizable as having a shorter critical path than the circuit of FIG. 2. In short, the circuit of FIG. 3 provides faster speeds of operation. It is also noted that pipelined implementations of the circuits presented herein is also possible.

It is noted that while the values of m, n and k appear to be limiting, this is not really the case since it is always possible to pad the leftmost or higher order bit positions with zeros to whatever extent desired to achieve values that are reasonable and effective. In particular, the choice of k=32 is a convenient one for the current state of the art in terms of circuit design. Typically, the value of mk is a number like 1,024; 2,048 or 4,096, or a number close to one of these. In general, the values of m and k are chosen for convenience of design and as a function of the degree of security one wishes to achieve in a cryptography system in which the present method and circuits are employed. It is also noted that the present invention also easily accommodates the situation in which the number of bits or k-bit blocks in A and B are different. In this respect the present method and system are more general than the Montgomery algorithm. In general, if this is the case, the shorter factor is supplied through the $B_i$ input for greater speed since this reduces the number of iterations. However, if the size of the A register (202 or 302) is of concern, then register size can be traded off for speed by feeding the longer factor into the system as the $B_i$ input.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for producing A mod N, where A is a binary number considered as having n blocks with k bits each and where N is a binary number considered as having m blocks of k bits each, said method comprising the steps of:
   loading the value $R_N = R^{m+1} \bmod N$, where $R=2^k$, into a first register;
   loading a second register for the variable Z with the high order m blocks for A; and
   for values of i ranging from n−1 to m+1, replacing the value in said second register with the value $Z - Z_i R^i + Z_i R_N R^{i-m-1}$, but if adding $Z_1 R_N$ and the low order (m+1)k bits of the second register produces a carry out indication, replacing the value in said second register instead with the value $Z - Z_i R^i + Z_i R_N R^{i-m-1} - R^i + R_N R^{i-m-1}$, where Z is the current value in said second register and $Z_i$ is the high order k bits in said second register, and shifting said second register left and shifting into said second register, on the right thereof, the next k bit block of A.

2. The method of claim 1 in which multiplication by R is carried out by a k bit shift.

3. The method of claim 1 in which said first register has mk bits.

4. The method of claim 1 in which said second register has (m+2)k bits.

5. A circuit for producing A mod N, where A is a binary number considered as having n blocks with k bits each and where N is a binary number considered as having m blocks of k bits each, said circuit comprising:

a shift register with mk+2k bits arranged in k bit blocks for initially holding the m highest order blocks of A and for receiving subsequent k bit blocks of A shifted into the lowest order k bit block of said shift register;

a storage register for holding mk bits representing the value $R^{m+1}$ mod N, where $R=2^k$;

a multiplier circuit for multiplying the contents of said storage register by the k bits in the highest order position in said shift register;

a first adder circuit for adding the output from said multiplier to the low order mk+k bits in said shift register; and a second adder for adding the contents of said storage register to the output from said first adder upon the condition that said first adder circuit produces a carry out signal, otherwise adding zero.

6. The circuit of claim 5 in which said first adder produces a carry out signal which is supplied to an AND gate which controls whether or not the content of said storage register is added in said second adder.

7. A method for producing A×B mod N where A and B are binary numbers with at least one of them being considered as having m blocks with k bits each and where N is a binary number, said method comprising the steps of:

loading a value $R^{m+1}$ mod N, where $R=2^k$, into a first register;

loading A into a multiplicand register;

setting an intermediate result register to zero;

for values of i ranging from m−1 to 1 carrying out steps (a) through (g) below:

(a) forming a first product of A and $B_i$ where $B_i$ is the $i^{th}$ k bit block of B with $B_0$ being the low order block;

(b) adding, in a first unconditional addition, the contents of said intermediate result register to said first product;

(c) upon the condition that said first addition produces a carry out, adding, in a first conditional addition, the contents of said first register to the results of said first unconditional addition to produce an output having k high order bits and mk low order bits, otherwise adding zero to produce said output;

(d) forming a second product of the contents of said first register and the k high order bits from the output of said first conditional addition;

(e) adding, in a second unconditional addition, the mk low order bits from said first conditional addition with k bits, which are zero, appended on the rightmost end of said mk low order bits, and said second product;

(f) upon condition that said second unconditional addition produces a carry out, adding, in a second conditional addition, the contents of said first register to the results of said second unconditional addition, otherwise adding zero; and (g) loading the result of said second unconditional addition operation to said intermediate result register.

8. A circuit for producing A×B mod N, where A and B are binary numbers with at least one of them being considered as having m blocks with k bits each and where N is a binary number, said circuit comprising:

an intermediate storage register;

a multiplicand register for storing the value of A;

a constant register for storing the value $R^{m+1}$ mod N where $R=2^k$;

a first multiplier for producing the product of A and $B_i$ where $B_i$ is the $i^{th}$ k bit block of B with $B_0$ being the low order block;

a first unconditioned adder for producing the sum of the product from said first multiplier and the contents of said intermediate storage register, said first unconditioned adder also producing a first carry signal;

a first conditioned adder for producing the sum of the contents of said constant register and the sum from said first unconditioned adder upon the condition that said first carry signal indicates a carry out of the leftmost bit position from said first unconditioned adder;

a second multiplier for producing the product of the contents of said constant register and the leftmost k bits in said sum produced by said first conditioned adder;

a second unconditioned adder for producing the sum of the product from said second multiplier and the rightmost mk bits from first conditioned adder with k bits, which are zero, appended on the rightmost end of said rightmost mk bits, said second unconditioned adder also producing a second carry signal;

a second conditioned adder for producing the sum of the contents of said constant register and the sum from said second unconditioned adder upon the condition that said second carry signal indicates a carry out of the leftmost bit position from said second unconditioned adder; and a feedback connection for supplying the sum from said second conditioned adder to said intermediate storage register.

9. A method for producing A×B mod N where A and B are binary numbers with at least one of them being considered as having m blocks with k bits each and where N is a binary number, said method comprising the steps of:

loading a value $R^{m+1}$ mod N, where $R=2^k$, into a first register;

loading A into a multiplicand register;

setting an intermediate result register to zero;

for values of i ranging from m−1 to 0 carrying out steps (a) through (g) below:

(a) forming a first product of the contents of said first register and the leftmost k bits in said intermediate result register;

(b) adding, in a first unconditioned addition, said first product and the low order mk bits from said intermediate result register with k bits, which are zero, appended on the rightmost end of said mk bits and;

(c) upon condition that said first unconditioned addition produces a carry out, adding, in a first conditioned addition, the output from said first unconditioned addition and the contents of said first register, otherwise adding zero;

(d) forming a second product of the contents of said multiplicand register and $B_i$ where $B_i$ is the $i^{th}$ k bit block of B with $B_0$ being the low order block;

(e) adding, in a second unconditioned addition, said second product and the output from said first conditioned addition;

(f) upon condition that said second unconditioned addition produces a carry out, adding, in a second conditioned addition, the output from said second unconditioned addition and the contents of said first register, otherwise adding zero; and (g) loading the result of said second conditioned addition into said intermediate result register.

10. A circuit for producing A×B mod N, where A and B are binary numbers with at least one of them being considered as having m blocks with k bits each and where N is a binary number, said circuit comprising:

an intermediate storage register;

a multiplicand register for storing the value of A;

a constant register for storing the value $R^{m+1}$ mod N where $R=2^k$;

a first multiplier for producing the product of A and $B_i$ where $B_i$ is a k bit block of B with $B_0$ being the low order block;

a second multiplier for producing the product of the contents of said constant register and the leftmost k bits in said intermediate storage register;

a first unconditioned adder for producing the sum of the product from said second multiplier and the contents of the rightmost mk bits from said intermediate storage register with k bits, which are zero, appended on the rightmost end of said rightmost mk bits, said first unconditioned adder also producing a first carry signal;

a first conditioned adder for producing the sum of the contents of said constant register and the sum from said first unconditioned adder upon the condition that said first carry signal indicates a carry out of the leftmost bit position from said first unconditioned adder;

a second unconditioned adder for producing the sum of the product from said first multiplier and the sum from said first conditioned adder, said second unconditioned adder also producing a second carry signal;

a second conditioned adder for producing the sum of the contents of said constant register and the sum from said second unconditioned adder upon the condition that said second carry signal indicates a carry out of the leftmost bit position from said second unconditioned adder; and a feedback connection for supplying the sum from said second conditioned adder to said intermediate storage register.

11. A computer readable medium having computer executable instructions thereon for causing a computer to perform the following operations for producing A mod N, where A is a binary number considered as having n blocks with k bits each and where N is a binary number considered as having m blocks of k bits each:

loading the value $R_N = R^{m+1}$ mod N, where $R=2^k$, into a first register;

loading a second register for the variable Z with the high order m blocks for A; and for values of i ranging from n−1 to m+1, replacing the value in said second register with the value $Z - Z_i R^i + Z_i R_N R^{i-m-1}$, but if adding $Z_i R_N$ and the low order (m+1)k bits of the second register produces a carry out indication, replacing the value in said second register instead with the value $Z - Z_i R^i + Z_i R_N R^{i-m-1} - R^i + R_N R^{i-m-1}$, where Z is the current value in said second register and $Z_i$ is the high order k bits in said second register, and shifting said second register left and shifting into said second register, on the right thereof, the next k bit block of A.

12. A computer readable medium having computer executable instructions thereon for causing a computer to perform the following operations for producing A×B mod N, where A and B are binary numbers with at least one of them being considered as having m blocks with k bits each and where N is a binary number considered as having m blocks of k bits each:

loading a value $R^{m+1}$ mod N, where $R=2^k$, into a first register;

loading A into a multiplicand register;

setting an intermediate result register to zero;

for values of i ranging from m−1 to 1 carrying out steps (a) through (g) below:

(a) forming a first product of A and $B_i$ where $B_i$ is the $i^{th}$ k bit block of B with $B_0$ being the low order block;

(b) adding, in a first unconditional addition, the contents of said intermediate result register to said first product;

(c) upon the condition that said first addition produces a carry out, adding, in a first conditional addition, the contents of said first register to the results of said first unconditional addition to produce an output having k high order bits and mk low order bits, otherwise adding zero to produce said output;

(d) forming a second product of the contents of said first register and the k high order bits from the output of said first conditional addition;

(e) adding, in a second unconditional addition, the mk low order bits from said first conditional addition with k bits, which are zero, appended on the rightmost end of said mk low order bits, and said second product;

(f) upon condition that said second unconditional addition produces a carry out, adding, in a second conditional addition, the contents of said first register to the results of said second unconditional addition, otherwise adding zero; and (g) loading the result of said second unconditional addition operation to said intermediate result register.

13. A computer readable medium having computer executable instructions thereon for causing a computer to perform the following operations for producing A×B mod N, where A and B are binary numbers with at least one of them being considered as having m blocks with k bits each and where N is a binary number considered as having m blocks of k bits each:

loading a value $R^{m+1}$ mod N, where $R=2^k$, into a first register;

loading A into a multiplicand register;

setting an intermediate result register to zero;

for values of i ranging from m−1 to 0 carrying out steps (a) through (g) below:

(a) forming a first product of the contents of said first register and the leftmost k bits in said intermediate result register;

(b) adding, in a first unconditioned addition, said first product and the low order mk bits from said intermediate result register with k bits, which are zero, appended on the rightmost end of said mk bits and;

(c) upon condition that said first unconditioned addition produces a carry out, adding, in a first conditioned addition, the output from said first unconditioned addition and the contents of said first register, otherwise adding zero;

(d) forming a second product of the contents of said multiplicand register and $B_i$ where $B_i$ is the $i^{th}$ k bit block of B with $B_0$ being the low order block;

(e) adding, in a second unconditioned addition, said second product and the output from said first conditioned addition;

(f) upon condition that said second unconditioned addition produces a carry out, adding, in a second conditioned addition, the output from said second unconditioned addition and the contents of said first register, otherwise adding zero; and (g) loading the result of said second conditioned addition into said intermediate result register.

* * * * *

UNITED STATES PATENT AND TRADEMARK OFFICE
CERTIFICATE OF CORRECTION

PATENT NO. : 7,627,114 B2  Page 1 of 1
APPLICATION NO. : 10/263032
DATED : December 1, 2009
INVENTOR(S) : Chin-Long Chen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1801 days.

Signed and Sealed this

Second Day of November, 2010

David J. Kappos
*Director of the United States Patent and Trademark Office*